J. W. RILEY.
SAW SET.
APPLICATION FILED MAY 7, 1912.
1,070,916.
Patented Aug. 19, 1913.
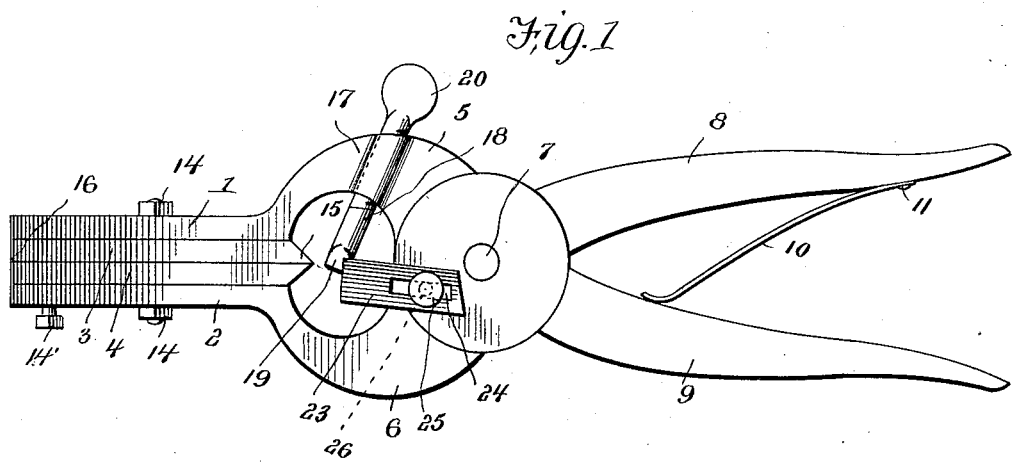
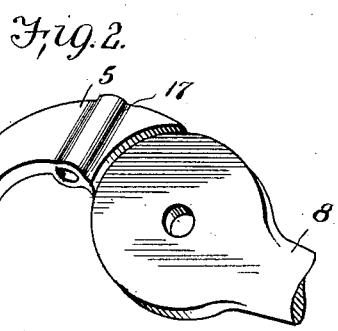
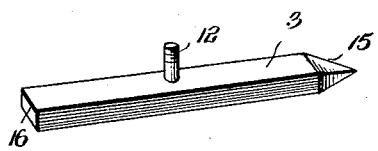
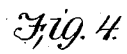
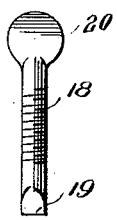
Inventor
James W. Riley.
Witnesses
William Smith
R. M. Smith
By Victor J. Evans
Attorney
COLUMBIA PLANOGRAPH CO., WASHINGTON, D. C.

UNITED STATES PATENT OFFICE.

JAMES W. RILEY, OF EAST OMAHA, NEBRASKA.

SAW-SET.

1,070,916.   Specification of Letters Patent.   Patented Aug. 19, 1913.

Application filed May 7, 1912. Serial No. 695,758.

*To all whom it may concern:*

Be it known that I, JAMES W. RILEY, a citizen of the United States, residing at East Omaha, in the county of Douglas and State of Nebraska, have invented new and useful Improvements in Saw-Sets, of which the following is a specification.

This invention relates to saw sets, the object of the invention being to provide a device of the character referred to which will grip and clamp the saw, and at the same time set the teeth one at a time, the device being adapted to teeth of varying sizes, such as are used on cross cut and rip saws.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of the saw set embodying the present invention. Fig. 2 is a perspective view of one member of the saw set which carries the setting post. Fig. 3 is a detail perspective view of one of the clamping plates. Fig. 4 is a similar view of the gage. Fig. 5 is a detail view of the post. Fig. 6 is a detail perspective view of the beveled end of the setting post.

The saw set contemplated in this invention comprises a pair of parallel jaws 1 and 2, to the inner surfaces of which are applied the face plates 3 and 4, respectively. These jaws are extended to form the semi-circular or segmental portions 5 and 6 which are pivotally connected together by the bolt, screw or pivot 7, in rear of which are the operating handles 8 and 9, normally held apart by an interposed spring 10 secured at one end to one of the handles, as shown at 11, and bearing at its opposite end against the other handle.

Each of the face plates 3 and 4 is provided with a small shank or tongue 12 which is received in the slot 13 extending lengthwise of the adjacent jaw, said shank 12 being threaded to receive a nut 14, by means of which the face plate may be secured in fixed relation to the adjacent jaw. One of the jaws is provided with a set screw 14', by means of which the adjacent face plate may be adjusted as to its angle or pitch, so as to bring the inner faces of the face plates in parallel relation to each other, so as to effectively clamp the saw blade between them. At one end, these face plates 3 and 4 are reversely beveled, as shown at 15, while at the other end they are cut off abruptly, as shown at 16. Thus by reversing the face plates 3 and 4, or in other words, turning the same end for end, they are adapted to teeth of different sizes, such as are found in cross cut and rip saws, respectively. It is also possible to allow more or less of the teeth to project, according to the amount of tooth to be bent over laterally by the setting post.

One of the members of the saw set is enlarged, as shown at 17, and bored through and internally threaded, as shown, to receive the setting post 18, the inner end of which is substantially triangular in cross section, as shown at 19, while the outer end thereof is provided with a head 20 adapting said post to be turned on its longitudinal axis for moving the setting end of the post farther inward or outward, according to requirements.

In connection with the post 18 and the clamping jaws, hereinabove described, I also employ a gage, comprising the main body portion 21 which extends parallel to the axis of movement of the jaws, and is provided with a notch or recess 22, through which the post 18 works, it being observed that the post 18 is carried by one of the pivotally connected members of the device, while the gage is carried by the other member. At one end, the gage 21 is provided with a perpendicular extension or base 23 which is slotted, at 24, to receive a binding screw 25 which enters a threaded hole 26 in the member by which the gage is carried. This provides for adjusting the gage toward and away from the inner ends of the face plates 3 and 4 to give the required projection to the saw tooth, as it is acted upon by the setting post 18.

From the foregoing description, it will be observed that by operating the handles 8 and 9, the face plates are brought into clamping engagement with the saw blade, the inward movement of which is limited by the saw teeth coming into contact with the face of the gage 21. As the movement of the handles of the saw set is completed, the post 18 operates laterally against the adjacent tooth in line therewith to deflect said tooth laterally and give the same the proper set, which is of course regulated by the adjustment given to the setting post.

What is claimed is:

1. In a saw set, a pair of pivotally connected saw blade clamping jaws, handle lever extensions therefor, a tooth setting element connected to one of the jaws, a gage connected to one of the jaws, and face plates adjustably fastened to the jaws and adapted to be moved lengthwise thereof toward and away from the working face of the gage.

2. In a saw set, a pair of pivotally connected saw blade clamping jaws, handle lever extensions therefor, a tooth setting element connected to one of the jaws, a gage connected to one of the jaws, and reversible face plates adjustably fastened to the jaws and adapted to be moved lengthwise thereof toward and away from the working face of the gage, said face plates having their opposite extremities of different shapes.

3. In a saw set, a pair of pivotally connected saw blade clamping jaws, handle lever extensions therefor, a tooth setting element connected to one of the jaws, a gage connected to one of the jaws, face plates adjustably fastened to the jaws and adapted to be moved lengthwise thereof toward and away from the working face of the gage, and a set screw for offsetting one of the face plates from the jaw to which it is fastened.

4. In a saw set, a pair of pivotally connected saw blade clamping jaws, handle lever extensions therefor, a tooth setting element connected to one of the jaws and having a threaded and adjustable engagement with one of the jaws, a gage connected to one of the jaws, and face plates adjustably fastened to the jaws and adapted to be moved lengthwise thereof toward and away from the working face of the gage.

5. In a saw set, a pair of pivotally connected saw blade clamping jaws, handle lever extensions therefor, a tooth setting element connected to one of the jaws, a gage connected to one of the jaws, said gage extending parallel to the axis of movement of the jaws and having a slotted extension perpendicular to the body of the gage and adjustably connected to one of the jaws, and face plates adjustably fastened to the jaws and adapted to be moved lengthwise thereof toward and away from the working face of the gage.

In testimony whereof I affix my signature in presence of two witnesses.

JAMES W. RILEY.

Witnesses:
M. H. TORASSIAN,
J. F. KELLY.

---

Copies of this patent may be obtained for five cents each, by addressing the "Commissioner of Patents, Washington, D. C."